US010706715B2

(12) United States Patent
Lamb

(10) Patent No.: US 10,706,715 B2
(45) **Date of Patent: *Jul. 7, 2020**

(54) DIY MONITORING APPARATUS AND METHOD

(71) Applicant: Ecolink Intelligent Technology, Inc., Carlsbad, CA (US)

(72) Inventor: Michael Lamb, Rancho Santa Fe, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,257

(22) Filed: Jul. 13, 2017

(65) Prior Publication Data

US 2017/0309160 A1 Oct. 26, 2017

Related U.S. Application Data

(63) Continuation of application No. 14/716,087, filed on May 19, 2015, now Pat. No. 9,805,587.

(51) Int. Cl.
*G08B 25/10* (2006.01)
*G08B 25/01* (2006.01)
(Continued)

(52) U.S. Cl.
CPC ........... *G08B 25/10* (2013.01); *G08B 25/001* (2013.01); *G08B 25/009* (2013.01); *G08B 25/016* (2013.01); *G08B 25/08* (2013.01)

(58) Field of Classification Search
CPC ............ G08B 13/196; G08B 13/19602; G08B 13/19656; G08B 13/19663;
(Continued)

(56) References Cited

U.S. PATENT DOCUMENTS 6,624,750 B1 9/2003 Marman et al.
8,027,659 B1 9/2011 Daley et al.
(Continued)

FOREIGN PATENT DOCUMENTS

JP 2007233679 A 9/2007

OTHER PUBLICATIONS

ISA/US, Int. Search Report and Written Opinion issued on PCT application No. US16/18467, dated May 17, 2016, 9 pages.
(Continued)

*Primary Examiner* — Ojiako K Nwugo
(74) *Attorney, Agent, or Firm* — Greenberg Traurig, LLP

(57) ABSTRACT

The present disclosure relates to a software application used on mobile devices that enables professional monitoring services to DIY monitoring systems that lack an ability to communicate with remote monitoring facilities. In one embodiment, alert messages are transmitted by a monitoring system gateway and received by a personal communication device. The alert messages indicate occurrences of events at a monitored premises. When the software application determines that an incoming communication is an alert message, an indication is provided to a user of the mobile device that an event has occurred at the premises, and giving the user a predetermined time period in which to respond to the indication. If the user fails to respond to the indication within a predetermined time period, a message is transmitted to a remote monitoring facility, alerting the remote monitoring facility of the event.

15 Claims, 4 Drawing Sheets

(51) Int. Cl.
*G08B 25/00* (2006.01)
*G08B 25/08* (2006.01)

(58) Field of Classification Search
CPC ........ G08B 13/19669; G08B 13/19684; G08B 13/19695; G08B 25/008; G08B 25/009; G08B 29/00; G06T 7/004; H04N 7/18
USPC ............................................ 340/539.11, 540
See application file for complete search history.

(56) References Cited

U.S. PATENT DOCUMENTS

| | | | | |
|---|---|---|---|---|
| 8,520,072 | B1 * | 8/2013 | Slavin | G08B 13/19684 348/143 |
| 2002/0095269 | A1 * | 7/2002 | Natalini | H04L 12/2803 702/188 |
| 2005/0038853 | A1 * | 2/2005 | Blanc | G05B 15/02 709/206 |
| 2005/0108348 | A1 | 5/2005 | Lee | |
| 2006/0055529 | A1 | 3/2006 | Ratiu et al. | |
| 2007/0262857 | A1 | 11/2007 | Jackson | |
| 2009/0029716 | A1 * | 1/2009 | Thomas | H04M 11/04 455/456.1 |
| 2010/0274366 | A1 * | 10/2010 | Fata | G05B 15/02 700/7 |
| 2011/0167477 | A1 * | 7/2011 | Piccirillo | G06F 21/31 726/4 |
| 2011/0210846 | A1 | 9/2011 | Causey et al. | |
| 2011/0279259 | A1 | 11/2011 | Jackson | |
| 2011/0279269 | A1 * | 11/2011 | Gerber | G06F 1/14 340/540 |
| 2012/0027010 | A1 * | 2/2012 | Elliot | H04L 12/1471 370/352 |
| 2012/0086573 | A1 * | 4/2012 | Bischoff | G06F 19/3418 340/573.1 |
| 2012/0250834 | A1 * | 10/2012 | Smith | H04M 11/04 379/45 |
| 2013/0070928 | A1 * | 3/2013 | Ellis | H04R 25/30 381/56 |
| 2013/0252649 | A1 * | 9/2013 | Siomina | H04W 4/02 455/466 |
| 2013/0257611 | A1 | 10/2013 | Lamb et al. | |
| 2014/0253323 | A1 * | 9/2014 | Berven | G08B 21/02 340/539.12 |
| 2014/0357198 | A1 * | 12/2014 | Ye | H04W 4/02 455/73 |
| 2015/0029020 | A1 | 1/2015 | Bailey et al. | |

OTHER PUBLICATIONS

JPO, Office Action issued on Japanese patent application No. 2017-559808, dated Jan. 13, 2020, 16 pages.

* cited by examiner (Con't)

DIY MONITORING APPARATUS AND METHOD

CROSS REFERENCE TO RELATED APPLICATION

The present application claims priority to U.S. application Ser. No. 14/716,087 entitled "DIY MONITORING APPARATUS AND METHOD" filed on May 19, 2015, which is assigned to the assignee hereof and hereby expressly incorporated by reference herein

BACKGROUND

Field of Use

The present application relates to the field of monitoring systems. More specifically, the present application relates to providing professional monitoring services to do-it-yourself monitoring systems that lack such functionality.

Description of the Related Art

Professionally monitored home security systems have been around for many years and are quite popular. Typically, these systems comprise a security panel in communication with one or more sensors, such as doors/window sensors, tilt sensors, and motion detectors. The sensors inform the security panel when a change of state occurs in the sensors, indicative of a door or window being opened, a garage door being opened, or motion detected within a home. In response, the security panel may transmit a signal to a remote monitoring facility, where live operators receive the signal and decide whether or not to dispatch authorities.

In the professional home security market, security systems are sold by nationally-known security companies and installed by professional installers. Homeowners may choose to pay a monthly monitoring fee so that when an unauthorized entry is detected, a professionally-monitored remote facility is notified.

More recently, the home security industry has experienced a revolution in its traditional business model. The widespread availability of wireless sensors and ubiquitous Internet gateways has created a large market for do-it-yourself (DIY) security systems. These DIY systems are quick and easy for homeowners to install, however, most systems are not capable of communicating with traditional remote monitoring facilities. Rather, these systems typically send an alert to a homeowner in the form of a text message, email, or phone call. The advantage of this arrangement is that homeowners can be notified when an unauthorized intrusion has occurred when homeowners are away from home, and they do not have to pay for monthly monitoring services.

On the other hand, many DIY homeowners would like the comfort of knowing that a third party is monitoring the premises. Although it is foreseeable that DIY security systems may soon be capable of communicating with remote monitoring facilities, the millions of consumers who have already purchased a DIY security system would have no way to add monitoring services to their existing systems if they so desired.

Thus, it would be desirable to provide monitoring services to existing DIY security systems.

SUMMARY

The embodiments described herein relate to a software application used on mobile devices that enables professional monitoring services for do-it-yourself (DIY) monitoring systems that lack an ability to communicate with remote monitoring facilities. In one embodiment, a non-transient, processor-readable medium is disclosed, having program instructions stored thereon, which when executed by a processor, performs a method comprising receiving an incoming communication by a personal communication device via a communication interface, determining, by a processor within the personal communication device, that the incoming communication is an alert message from a monitoring system, providing an indication to a user via a user interface that an event has occurred at a premises monitored by the monitoring system, determining that the user has failed to respond to the indication within a predetermined time period, and transmitting a message to a remote monitoring facility when the user does not respond to the indication within the predetermined time period.

In another embodiment, a method is disclosed, comprising receiving an incoming communication by a personal communication device via a communication interface, determining, by a processor within the personal communication device, that the incoming communication is an alert message from a monitoring system, providing an indication to a user via a user interface that an event has occurred at a premises monitored by the monitoring system, determining that the user has failed to respond to the indication within a predetermined time period, and transmitting a message to a remote monitoring facility when the user does not respond to the indication within the predetermined time period.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present disclosure relates to a software application used on mobile devices that enables professional monitoring services to DIY monitoring systems that lack an ability to communicate with remote monitoring facilities. The term "monitoring systems" as used herein refer to home security systems, business security systems, health monitoring systems, energy management systems, hazard detection systems (such as smoke detectors, fire detectors, carbon monoxide detectors, etc.), thermostats, or any system or device for monitoring for an occurrence of an event or condition, such as break-in, fire, smoke, carbon monoxide, health problem, power outages, flooding, freezing, high electricity usage (indicative of, for example, a pool pump turning on, an air conditioner turning on, etc.) or some other event that may occur in a residence or business. Although the embodiments discussed in the present disclosure generally refer to such monitoring systems and devices as security systems, it should be understood that these other types of monitoring systems and devices could be used in the alternative.

Figure 1:
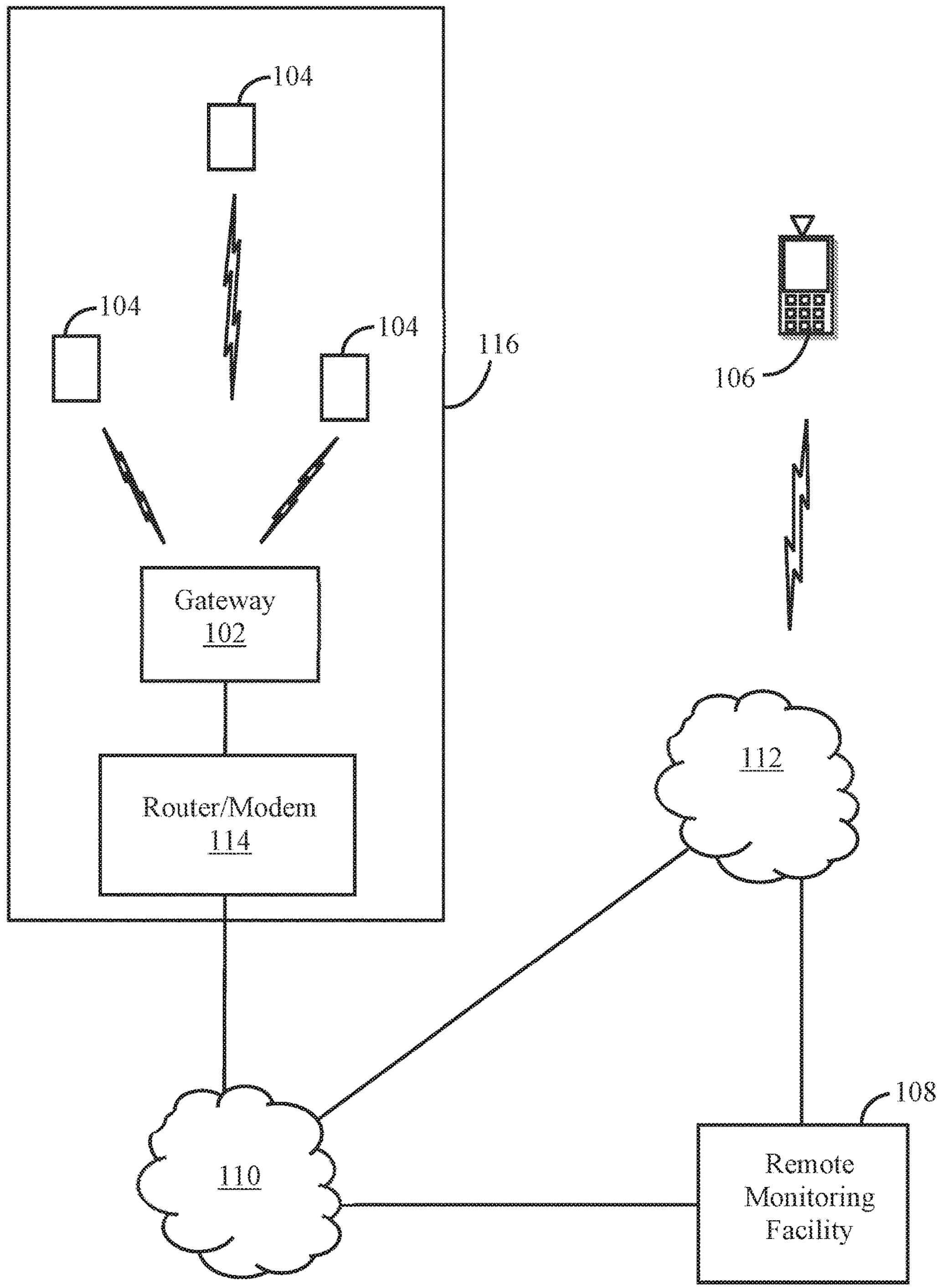
FIG. 1 is an illustration of one embodiment of a DIY monitoring system in accordance with the teachings herein.

FIG. 1 is an illustration of one embodiment of a DIY monitoring system 100 in accordance with the teachings herein, comprising gateway 102, sensors 104, personal communication device 106, a remote monitoring facility 108, wide-area network 110, wireless network 112, and router/modem 114. The sensors 104 are installed throughout premises 116 in order to detect "events" that may occur at premises 116, such as a door or window being opened, movement or sound within premises 116, the presence of smoke, fire, or carbon monoxide, freezing, flooding, a light being turned on or off, a medical emergency (such as a fall, an irregular heartbeat, low blood sugar, etc.), or other occurrence or condition that might be of interest to a home owner or other interested party. When one of the sensors detects an event, a signal is transmitted to gateway 102 by the sensor that detected the change, where gateway 102, in response, transmits an alert message to personal communication device 106 over one or more wide-area networks 110 and/or wireless network 112.

When personal communication device 106 receives the alert message from gateway 102, an indication is generated and provided to a user of personal communication device 106. The indication alerts the user of the fact that one of the sensors 104 has detected an event. The user may respond to the indication by operating personal communication device 106 via a user interface, such as a touchscreen device, one or more push-buttons, a microphone, an accelerometer, gyroscope, or other motion-sensitive device. For example, the indication from personal communication device 106 may comprise a ringtone, vibration, light, text message, phone call, or email message, or a combination of two or more of these. In response, the user may simply acknowledge receipt of the signal by touching the touchscreen device, pressing an icon on the touchscreen device, pressing a button, speaking into a microphone, or simply shaking personal communication device 106 in a predefined manner understood.

The user is given a predetermined time period in which to respond to any indication presented via personal communication device 106, for example, five minutes. If the user responds to the indication within this predetermined time period, personal communication device 106 refrains from sending a message to remote monitoring facility 108. Personal communication device 106 may present one or more actions for selection by the user, such as to view one or more still or video cameras within or on the monitored premises, to activate one or more lights and/or sirens in or on the monitored premises, to send a message to other members of premises 116 informing them of the alert, or some other action(s).

If the user fails to respond to the indication within the predetermined time period, personal communication device 106 sends a message to remote monitoring facility 108 in order for personnel at remote monitoring facility 108 evaluate the message from personal communication device 106. For example, based on the information contained in the message, an employee located at remote monitoring facility may choose to dispatch authorities to premises 116, such as an ambulance, police or fire department. In this way, professional monitoring services can be added to a DIY monitoring system that lacks the capability of contacting such remote monitoring facilities. Another advantage of this concept is that it reduces the occurrences of false alarms of monitoring system 100, because it gives homeowners an opportunity to respond to alert signals generated by the system and stop escalation of alarm signals to remote monitoring facility 108.

The main functionality of the inventive concepts discussed thus far reside in application software resident on personal communication device 106. Personal communication device 106 comprises virtually any electronic computing device capable of sending and receiving information over at least one wide-area network 110. Examples of personal communication device 106 include smartphones, tablet computers, personal digital assistants, wearables, laptop computers, desktop computers, or other devices capable of communicating, via wired or wireless means, with gateway 102 and remote monitoring facility 108. The application software may be preloaded onto personal communication device 106, for example, during provisioning by a service provider, or, more typically, downloaded by a user from an online application software "store", such as iTunes or Google Play. The application software is stored in a memory within personal communication device 106 and executed by a processor, also residing within personal communication device 106.

Figure 2:
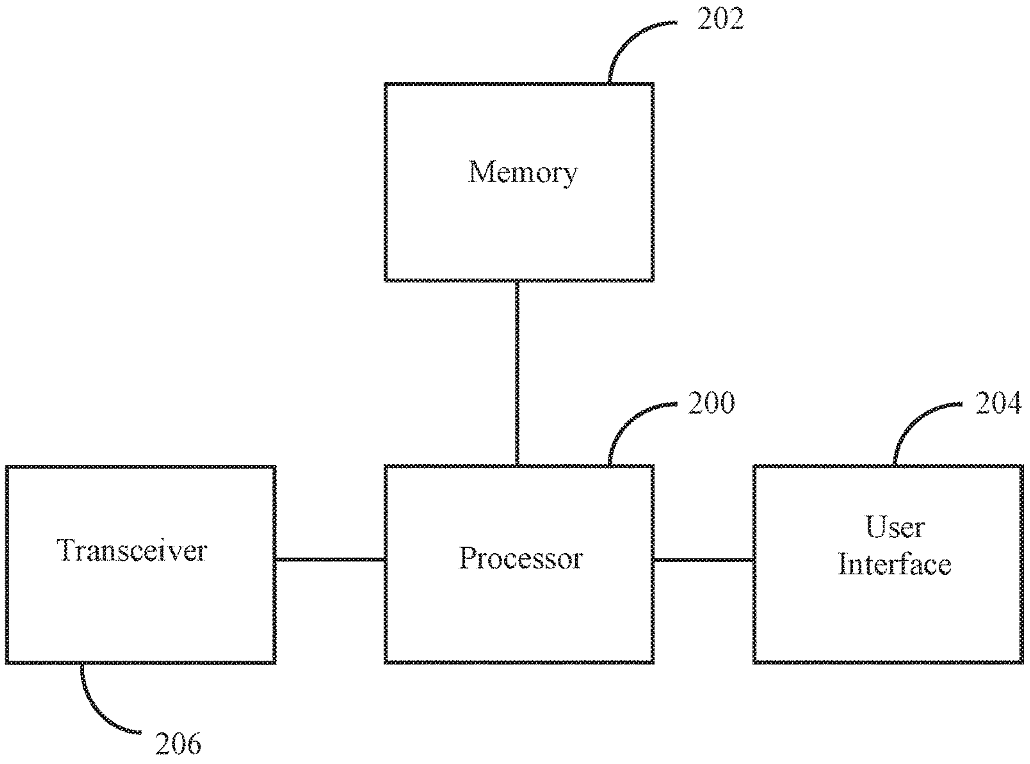
FIG. 2 is a functional block diagram of one embodiment of a personal communication device used to provide professional monitoring services to a DIY monitoring system that lacks a capability of communicating with a remote monitoring facility.

FIG. 2 is a functional block diagram of one embodiment of personal communication device 106, showing processor 200, memory 202, user interface 204, and one or more transceivers 206. It should be understood that the functional blocks shown in FIG. 2 may be connected to one another in a variety of ways, and that not all functional blocks necessary for operation of personal communication device 106 are shown (such as a power supply), for purposes of clarity.

Processor 200 is configured to provide general operation of personal communication device 106 by executing processor-executable instructions stored in memory 200, for example, executable code. Processor 200 typically comprises one or more microprocessors, microcontrollers, or custom ASICs that provide communications functionality to personal communication device 106 as well as to execute instructions that provide an ability for personal communication device 106 to receive alerts from gateway 102, provide indications of the alerts to a user, receive input from the user in response to the indications, and contacting remote monitoring facility 108 if the user does not respond to the indication within a predetermined time period.

Memory 202 comprises one or more non-transient information storage devices, otherwise referred to as one or more processor-readable mediums, such as RAM, ROM, flash memory, SD memory, XD memory, or virtually any other type of electronic, optical, or mechanical memory device. Memory 200 is used to store the processor-executable instructions for general operation of personal communication device 106 (for example, communication functionality) and for receiving alerts from gateway 102, providing indications of the alerts to a user, receiving input from the user in response to the indications, and contacting remote monitoring facility 108 if the user does not respond to the indication within a predetermined time period. Information such as a predetermined time period, contact information of remote monitoring facility 108, identification information of monitoring system 100/gateway 102, personal information of the user or other persons affiliated with premises 116, such as names, email addresses, telephone numbers, time/date information pertaining to received alarm signals, etc., can also be stored by memory 200.

User interface 204 is coupled to processor 200 and allows a user to receive indications from processor 200 when alert messages are received by personal communication device 106 from gateway 102 and to respond to such indications.

User interface 200 may comprise one or more pushbuttons, touchscreen devices, electronic display devices, lights, LEDs, LDCs, biometric readers, switches, sensors, keypads, microphones, speakers, and/or other human interface devices that present indications to a user or generate electronic signals for use by processor 200 upon initiation by a user. A very popular user interface device today is a touchscreen device.

Transceiver 206 comprises circuitry necessary to transmit and receive information to/from gateway 102 and remote monitoring facility 108, either wirelessly or via wired means, such as one or more of a cellular transceiver, a Wi-fi transceiver, a Bluetooth transceiver, a cellular data transceiver, an Ethernet adapter, POTS circuitry, AC powerline circuitry, ultrasonic circuitry, and/or some other type of wireless or wired means for communications. In some embodiments, more than one transceiver is present, for example, a cellular transceiver and a Wi-Fi transceiver. Such circuitry is generally well known in the art.

Figure 3:
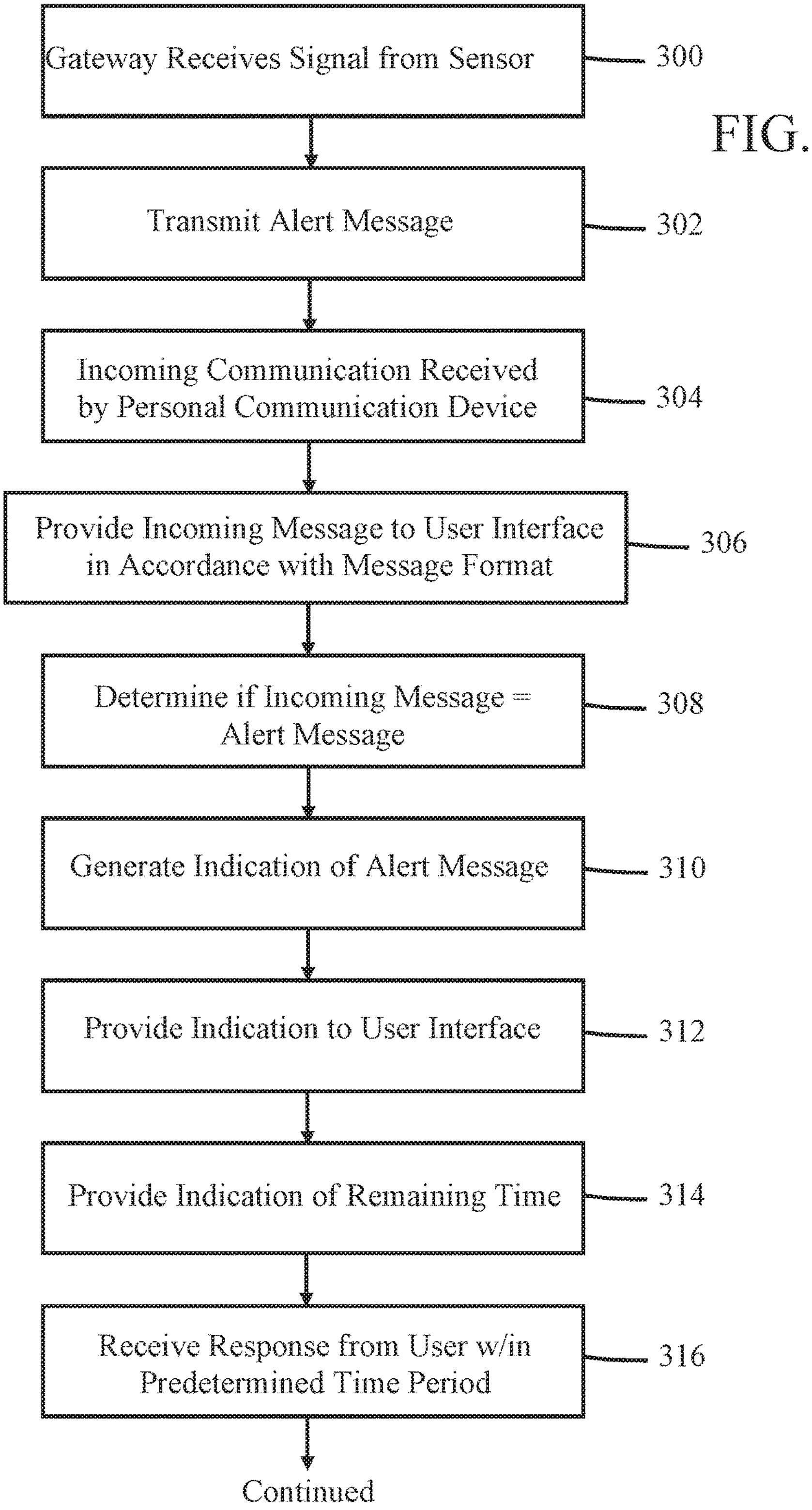
FIG. 3 is a flow diagram illustrating one embodiment of a method for providing remote monitoring functionality to a DIY monitoring system, carried out by a software application running on the personal communication device shown in FIG. 2.
Figure 3:
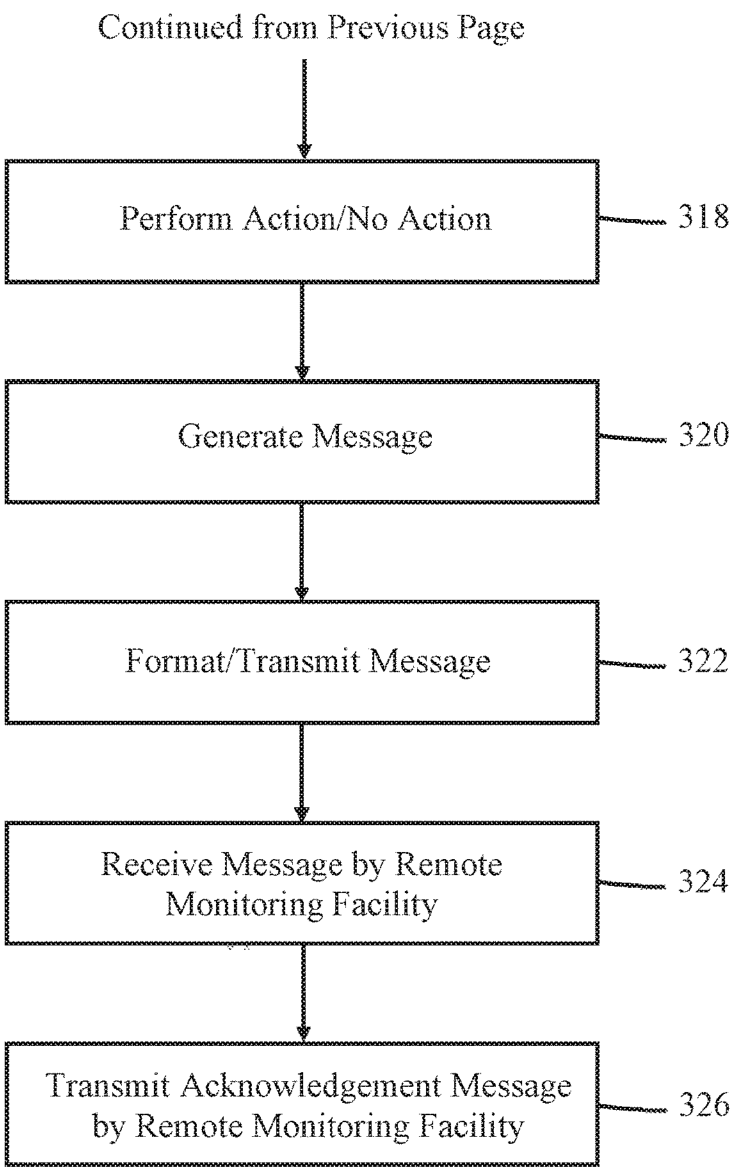

FIG. 3 is a flow diagram illustrating one embodiment of a method for providing remote monitoring functionality to a DIY monitoring system, carried out by a software application running on personal communication device 106. It should be understood that in some embodiments, not all of the steps shown in FIG. 3 are performed. It should also be understood that the order in which the steps are carried out may be different in other embodiments.

At block 300, gateway 102 receives a signal from one of the sensors 104 located throughout premises 116, indicating that an event has occurred. The signal is typically transmitted wirelessly from one of the sensors 104 and conforms to one of the common communication protocols in use today, such as RF, Z-wave, Zigbee, Wi-Fi, etc. The signal typically comprises information such as an identity of the sensor that transmitted the signal, such as a sensor type, sensor serial number, etc.

At block 302, gateway 102 transmits an alert message to personal communication device 106 via router/modem 114 and wide-area network 110 and/or wireless network 112 in response to receiving the signal from one of the sensors 104. The alert message comprises a phone call, email, text message, or some other communication type, and is encoded into one or more protocols suitable for transmission over one or more the networks. The alert message comprises information alerting a user of personal communication device 106 that an event has occurred at premises 116. The alert message is addressed to personal communication device 106 by accessing a memory within gateway 102 where addressing information pertaining to personal communication device 106 has been previously stored, such as a telephone number, IP address, email address, URL, etc.

The alert message may comprise further information pertaining to the event, such as an identification of the sensor that detected the event, a sensor serial number, a "zone" indicating which portion of premises 116 the event occurred, an "event type" such as "break-in", "door opened", "window opened", "motion sensed", "freezing detected", "flooding detected", "garage door opened", "light turned on/off", "medical emergency", etc., as determined by gateway 102 based on, for example, the type of sensor 104 sending the signal, a location of the sensor, etc. The alert message may also comprise an origination identification code of the alert message, for example an address of premises 116, an identification code assigned to gateway 102, such as a serial number, an account number associated with a homeowner or other resident of premises 116, a phone number or email address assigned to gateway 102 or system 100, or contact information of an owner or resident of premises 116, for example a telephone number or email address.

In another embodiment, the message comprises a standardized "alarm code" used extensively by traditional security panels that allow home monitoring by remote monitoring facilities, for example SIA, Radionics, Tunstall, DC-09, Contact ID, SIA DC-03 or SIA 2000 alarm codes. In this embodiment, gateway 102 determines which alarm code or codes to include in the alert message based on, for example, the type of sensor that reported an event. Use of alarm codes may allow processor 200 to easily identify incoming communications as alarm messages sent by system 100/gateway 102. Thus, one or more standardized alarm codes serve as the origination identification code.

At block 304, personal communication device 106 receives the alert message sent by gateway 102 via transceiver 306 and provides the alert message to processor 200. However, processor 200 does not know whether this incoming communication is an alert message transmitted by gateway 102 until further processing is conducted, as described in block 308 below. Thus, the alert message is initially processed as a typical phone call, text message, email, etc., as described in block 306.

At block 306, processor 200 provides the alert message to the user in accordance with the form or type of the alert message, using an application in accordance with the type of the alert message. For example, if the alert message is in the form of a text message, the alert message is displayed as a text messaging by a text messaging application resident on personal communication device 106. If the alert message is in the form of a voice call, the alert message is provided to the user via a phone application resident on personal communication device 106, i.e., a ring tone and/or vibration is activated by processor 200, and the alert message provided audibly to the user after the user responds to the ring tone and/or vibration. If the alert message is in the form of an email, the alert message is provided to the user via an email application resident on personal communication device 106.

At block 308, processor 200 determines whether the incoming communication at block 304 comprises an alert message by determining whether one or more attributes of the incoming communication match one or more predetermined attributes stored in memory 202. For example, processor 200 may determine that an alert message has been received when a text message is received having originated from gateway 102. This may be determined by processor 200 evaluating incoming text messages and comparing an origination identification code within each text message to a monitoring system identification code stored in memory 202. The monitoring system identification code is a code that uniquely identifies gateway 102 and/or monitoring system 100. The origination identification code could comprise an IP address, telephone number, serial number, or other code assigned to gateway 102 or system 100 and included with each transmitted alert message by gateway 102 to uniquely identify gateway 102 and/or system 100 and/or premises 116. The same principle could be used to evaluate incoming email messages or telephone calls. In the case of email, the origination identification code could comprise an email address or IP address assigned to gateway 102 or system 100. In the case of a phone call, the origination identification code could comprise a telephone number assigned to gateway 102 or system 100. When processor 200 determines that the incoming communication is an alert message, processing continues to block 310.

At block 310, in response to determining that an alert message has been received, processor 200 generates an indication for presentation to a user of personal communication device 106 of the alert message. This indication may be in alternative or in addition to the phone, email, text, or other message presented to the user in block 306. In another embodiment, the indication may be appended to the phone, email, text or other message presented to the user in block 306 after processor 200 has determined that the incoming communication comprises an alert message.

The indication generally comprises a visual, audio, and/or tactile alert to a user of the origination identification code, indicating that an event has occurred at premises 116. In some embodiments, the indication comprises a simple alert, such as an illumination of a light, production of an audible tone(s), and/or causing personal communication device 106 to vibrate. In other embodiments, additional information is conveyed in the indication, such as a visual or audible indication of the event type, an identification of the sensor that detected the event, a sensor serial number, a "zone" indicating which portion of premises 116 the event occurred, an address where the event occurred, and/or contact information of one or more persons to call in case of any event, or in particular events. For example, if the event is a break-in, processor 102 may display a telephone number of a police department nearby premises 116 as previously stored in, and retrieved from, memory 202. In case of a fire, one or more names and telephone numbers of neighbors could be displayed, again previously stored in and retrieved from memory 202. The indication may be presented by to the user differently than how the alert message was initially presented to the user via a traditional phone, text, or email application. For example, the software application may display a pop-up message or other display indicating that an alert message was received.

At block 312, the indication is provided from processor 200 to user interface 204.

At block 314, processor may provide an indication of a remaining time in which a user has to respond to the indication provided at block 306. For example, an analog or digital clock may be displayed via user interface, counting down from a predetermined time period, for example, five minutes, representing a remaining amount of time a user has to respond to the indication. Whether this "countdown" clock is displayed or not, a countdown timer may be used by processor 200 to determine when expiration of the predetermined time period has occurred. In one embodiment, the indication described in block 310 comprises the countdown clock.

At block 316, when a response is received by processor 200 from user interface 204 from a user responding to the indication within the predetermined time period, personal communication device 106 refrains from sending a signal to remote monitoring facility 108, as described below, informing remote monitoring facility of the event.

At block 318, processor 200 may perform one or more actions based on the response from the user at block 316. In one embodiment, processor 200 does nothing, for example, when the user simply acknowledges the indication by operating personal communication device 106 in a predetermined manner, such as pressing an "OK" icon displayed on user interface 204, pressing a key as part of user interface 204, shaking personal communication device 106 in a predetermined manner, or some other way of informing processor 200 that the user has received the indication and wishes to perform no further action. In another embodiment, the response from the user may indicate to processor 200 that the user wishes to place a phone call, text message, or email to one or more parties that may be interested in knowing about the event. In this embodiment, processor 200 may display a list of one or more names, icons, or other information identifying one or more people or entities, such as police departments, fire departments, paramedics, etc. The user may select one or all of the names, wherein processor 200 causes personal communication device 106 to send either a predetermined message to the selected persons/entities via a selected or default communication method (such as email, text, or phone call), or sends a custom message to one or more persons/entities as a result of receiving such a customized message from the user via user interface 204, such as a text or voice input from the user. Additionally, or in response, the indication may request that additional information be provided to the user, such as a request to provide still or video images of premises 116 via one or more still or video cameras located in one or more locations at premises 116. In this case, processor 200 receives the indication and provide one or more still images and/or recorded or live video streams from premises 116. This may occur as a result of processor 200 sending a request to gateway 102 for gateway 102 to provide such information, or it may occur as a result simply by accessing one or more cameras directly through gateway 102 by personal communication device 106. Similarly, an audio channel may be established between personal communication device 106 and a listening device sensor located at premises 116 for the user to listen to sounds that may be or have occurred at premises 116.

When the user does not respond to the indication within the predetermined time period, for example, when a countdown timer expires, processor 200 generates a message for transmission to a remote monitoring facility 108, informing remote monitoring facility 108 of an occurrence of an event at premises 116, at block 320. The message may comprise information pertaining to the event, such as an event type (such as "fire", "medical emergency", "carbon monoxide", "break-in", "motion detector event", "door/window sensor event", etc.) a location of premises 116, e.g., an address, contact information (e.g., telephone number, email address, etc.) of one or more persons associated with premises 116, such as an owner, renter, resident family members, friends and/or family of the aforementioned, etc., a time that the event occurred, information pertaining to the particular sensor that triggered the event (e.g., sensor serial number, sensor type, etc.), zone information of where the event was discovered, etc. In another embodiment, the message comprises less information, for example an indication that an event of some kind has occurred at premises 116 and an identification code that identifies an origination of an alert message that necessitated generation of the message, for example, an account number associated with a homeowner or other interested party that has pre-registered with remote monitoring facility, an identification number associated with system 100 or gateway 102, a telephone number of a homeowner or other interested party, an address of premises 116, etc. In this embodiment, personnel at remote monitoring facility 108 receives the message and matches the identification information with account information pre-stored by remote monitoring facility 108. The account information pre-stored by remote monitoring facility 108 may then be used to contact a homeowner or other interested party, provide an address where the event has occurred, and/or other information useful to personnel at remote monitoring facility 108 to respond to the message sent by personal communication device 106.

In one embodiment, the message generated at block 320 comprises a standardized alarm code used extensively by traditional security panels that allow home monitoring by remote monitoring facilities, for example SIA, Radionics, Tunstall, DC-09, Contact ID, SIA DC-03 or SIA 2000 alarm codes. A table of such alarm codes may be stored in memory 202 and processor 200 may determine which alarm code to include in the message to remote monitoring facility 108. Processor 200 may evaluate incoming communications to determine if they indicate “fire”, “smoke”, “door/window sensor”, “medical emergency”, “motion”, or some other event or condition occurring at premises 116 and attempt to match the event or condition to a best-fit match to one or more of the alarm codes stored in memory 202. In one embodiment, the message from gateway 102 comprises a standardized alarm code. In this case, processor 200 may simply include any alarm codes from incoming messages with outgoing messages, or it may map the alarm codes from incoming messages to a set of alarm codes stored in memory 202 and use one or more matched codes from memory 202 in the outgoing message. In one embodiment, more than one set of alarm codes are stored in memory 202. In this case, processor 200 may choose which set of alarm codes to use depending on an identification of a selected remote monitoring facility by a user of personal communication device 106.

In any case, processor 200 may generate the message by retrieving the aforementioned information from memory 202, which has been stored in memory 202 at a previous time, for example, entered by a user via user device 204 during setup of the software application that provides event monitoring for system 100. In another embodiment, some of the information may be stored by gateway 102 during an initialization of gateway 102 by a user at premises 116. Processor may also retrieve from memory 202 contact information (such as a telephone number, IP address, etc.) of a preferred remote monitoring facility 108. This information can be provided either by a user during initial setup of the software application, or it may be pre-loaded as part of the software application downloaded from an app store or the like. In one embodiment, contact information of a plurality of remote monitoring facilities are pre-loaded as part of the software application download. Then, during initial setup of the software application, a user may select which remote monitoring facility the user would like to contact in case the user fails to respond to an indication provided by personal communication device 106. The user may be queried to enter additional personal information after selection of this step, for example to provide the user’s name, address, and billing information to the selected remote monitoring facility. When the user is finished entering this information, it may be transmitted by transceiver 206 to the selected remote monitoring facility so that an account may be set up for the user. Thereafter, the selected monitoring facility will respond to signals sent by personal communication device 106. In yet another embodiment, after the user has selected a remote monitoring facility, the user may be connected to a website associated with the selected monitoring facility in order to set up an account with the selected monitoring facility, where the user provides personal information and billing information to the selected monitoring facility.

In any case, at block 322, the message is formatted into a certain type of message, such as an email, text message, or an audible message, including, for example, DTMF tones associated with well-known alarm code transmission protocols used by traditional home security panels capable of communicating with remote monitoring facilities. The message is transmitted to remote monitoring facility 108 via transceiver 206 and one or more wireless networks 112 and/or wide-area networks 110, using techniques well known in the art. The message is generally additionally formatted in accordance with one or more transmission standards in accordance with the type of transmission, i.e., voice communication, voice-over-IP, IP based, cellular voice, etc. In one embodiment, the message is transmitted to an intermediary entity capable of receiving cellular-based data communications and converting the cellular-based message into a format that is acceptable to remote monitoring facility 108, for example, DTMF tones. In another embodiment, the DTMF tones are transmitted directly to remote monitoring facility 108 via a cellular voice channel.

If DTMF tones are used to transmit information to remote monitoring facility 108, processor 200 may be configured to provide CID Handshake and Kissoff tone detection and generation. A CID handshake involves a particular tone sequence that is produced by remote monitoring facility 108 (or intermediate third party). The purpose of the CID handshake is to signal processor 200 that a communication channel is ready, for example, a cellular voice channel (the CID handshake is traditionally used by home monitoring systems communicating via a POTS telephone network). The handshake tone sequence is emitted by remote monitoring facility 108 after going off-hook and delaying an interval of at least 0.5 seconds but typically no greater than 2.0 seconds. This time allows the cellular network connection to “settle” before the communication process begins. In addition, processor 200 may have the ability to detect the “Kissoff Tone” from remote monitoring facility 108. The Kissoff Tone is used to tell processor 200 that a message has been received successfully. The frequency of the tone is typically 1400 Hz and is typically transmitted for a minimum of 750 msec. In this way, personal communication device 106 mimics a traditional, home security panel that is capable of communicating with remote monitoring systems via DTMF tones over a traditional POTS network.

At block 324, the message is received by remote monitoring facility 108 and is typically routed to an employee of the remote monitoring facility for analysis. Information of the event is typically displayed on a digital display monitor, showing information about the event such as the identification information of monitoring system 100/gateway 102 that generated an alarm signal, an event type, an identification of the sensor that detected the event, a sensor serial number, a “zone” indicating which portion of premises 116 the event occurred, an address where the event occurred, and/or contact information of one or more persons to call in case of any event, or in particular events. Additionally, or alternatively, remote monitoring facility 108 matches at least some of the information contained in the message provided by personal communication device 106, such as an account number, gateway/system identification number, and/or user name, with information stored in a database, where a database record corresponding to at least some of the information may be provided to the employee. For example, an account record may be stored in a database by remote monitoring facility 108 that contains contact information of one or more persons associated with the account matching at least some of the information contained within the signal provided by personal communication device 106. This information could be displayed to the employee so that the employee would be able to contact one or more persons by telephone, text, email, or other means, to ascertain the gravity of the event, and whether to dispatch authorities to premises 116.

At block 326, remote monitoring facility 108 may transmit an acknowledgement message to personal communication device 106, indicating that the signal had been successfully received, and perhaps other information, such as the time of successful reception, the name of an employee who evaluated the signal from personal communication device 106, a description of any actions that may have been taken by the employee, and/or contact information pertaining to persons or entities associated with the action(s) taken, such as a telephone number of a responding police or fire department.

In one embodiment, the acknowledgement message may take the form of a voice communication from remote monitoring facility 108 to personal communication device 106, so that an employee at remote monitoring facility 108 may obtain additional details from the user of personal communication device 106. The voice communication may comprise a traditional phone call from the employee, using the telephone number assigned to personal communication device 106. The telephone number assigned to personal communication device 106 may have been transmitted in the message to remote monitoring facility 108, or it may have been provided to the employee as a result of account information provided to the employee as a result of matching identification information in the message to an account stored in a database by remote monitoring facility 108. In another embodiment, a voice call is initiated using DTMF tones generated by remote monitoring facility 108 and personal communication device 106. For example, processor 200 may include an alarm code in the message transmitted to remote monitoring facility 108 at block 322, indicating a desire to open a voice communication with remote monitoring facility 108 (or an intermediate third party). For example, event code 606 is designated as a "Listen to follow" instruction used in the Ademco contact ID reporting methodology. When remote monitoring facility 108 receives this code, it knows that a reporting entity wishes to open a communication channel with remote monitoring facility 108. Traditionally, the reporting entity is a home monitoring system. However, this embodiment, the reporting entity is personal communication device 106.

Processor 200 may establish a voice communication with remote monitoring facility 108 using, for example, CID handshake tones. Processor 200 may enable user interface 204 to allow voice communications, such as enabling a microphone and speaker circuitry. Thereafter, the employee at remote monitoring facility 108 may speak to the user of personal communication device 106. At some point, the user may wish to terminate the voice communication by operating user interface 204 which, in turn, provides an electrical signal to processor 200 recognized as a desire to terminate the voice communication. Processor 200 may terminate the voice communication by transmitting a Kissoff Tone to remote monitoring facility 108.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A non-transient, processor-readable medium having program instructions stored thereon, which when executed by a processor, performs a method comprising:
- receiving an incoming communication by a personal communication device via a communication interface;
- determining, by the processor within the personal communication device, that the incoming communication is an alert message having data indicative of a type of an alarm event detected via use of from a monitoring system; and
- preventing a remote monitoring facility from being informed of the type of alarm event detected via use of the monitoring system until the processor determines that a suer interacts with a user interface that is caused to be provided to the personal communication device in response to the incoming communication being determined to be the alert message or a predetermined time period measured from the incoming communication being determined to be the alert message has lapsed.

2. The non-transient, processor-readable medium of claim 1, wherein the instructions for determining that the incoming communication is an alert message comprise instructions for:
- comparing an origination identification code in the incoming communication to a monitoring system identification code stored in a memory within the personal communication device; and
- determining that the incoming communication comprises an alert message from the monitoring system when the origination identification code in the incoming communication matches the monitoring system identification code.

3. The non-transient, processor-readable medium of claim 2, wherein the origination identification code comprises a standardized alarm code.

4. The non-transient, processor-readable medium of claim 2, wherein the origination identification code comprises a phone number associated with the monitoring system.

5. The non-transient, processor-readable medium of claim 1, wherein the incoming communication comprises a standardized alarm code.

6. The non-transient, processor-readable medium of claim 1, further comprising: establishing voice communications with the remote monitoring facility.

7. The non-transient, processor-readable medium of claim 1, further comprising:
- providing the incoming communication to the user via the user interface in accordance with a format of the alert message.

8. A method, comprising:

receiving an incoming communication via a communication interface of a personal communication device;

determining, by a processor within the personal communication device, that the incoming communication is an alert message having data indicative of a type of an alarm event detected via use of a monitoring system; and providing, by the processor, an indication to a user via a user interface associated with the personal communication device that an event has occurred at a premises monitored by the monitoring system;

determining, by the processor, that the user has failed to respond to the indication within a predetermined time period; and preventing, a remote monitoring facility from being informed of the type of alarm event detected via use of the monitoring system until the processor determines that a user interacts with a user interface that is caused to be provided to the perosnal communication device in response to the incoming communication being determined to be the alert message or a predetermined time period measured from the incoming communication being determined to be the alert message has lapsed.

9. The method of claim 8, further comprising:

comparing an origination identification code in the incoming communication to a monitoring system identification code stored in a memory within the personal communication device; and determining that the incoming communication comprises an alert message from the monitoring system when the origination identification code in the incoming communication matches the monitoring system identification code.

10. The method of claim 9, wherein the origination identification code comprises a standardized alarm code.

11. The method of claim 9, wherein the origination identification code comprises a phone number associated with the monitoring system.

12. The method of claim 8, wherein the monitoring system is not capable of directly communicating with the remote monitoring facility.

13. The method of claim 8, wherein the incoming communication comprises a standardized alarm code.

14. The method of claim 8, further comprising: establishing voice communications with the remote monitoring facility.

15. The method of claim 8, further comprising:

providing the incoming communication to the user via the user interface in accordance with a format of the alert message.

* * * * *